US010758017B2

(12) United States Patent
Norman

(10) Patent No.: US 10,758,017 B2
(45) Date of Patent: *Sep. 1, 2020

(54) DIAPHRAGM GAME CALL CASE

(71) Applicant: Nicholas Norman, Hamilton, GA (US)

(72) Inventor: Nicholas Norman, Hamilton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/234,043

(22) Filed: Dec. 27, 2018

(65) Prior Publication Data

US 2019/0200717 A1    Jul. 4, 2019

Related U.S. Application Data

(63) Continuation of application No. 13/792,570, filed on Mar. 11, 2013, now Pat. No. 10,188,186.

(51) Int. Cl.
| | | |
|---|---|---|
| *A45C 11/00* | (2006.01) | |
| *A45F 5/00* | (2006.01) | |
| *A01M 31/00* | (2006.01) | |
| *A45C 13/10* | (2006.01) | |

(52) U.S. Cl.
CPC ........... *A45C 11/00* (2013.01); *A01M 31/004* (2013.01); *A45C 13/103* (2013.01); *A45F 5/00* (2013.01); *A45F 2005/006* (2013.01)

(58) Field of Classification Search
CPC ......... A45C 11/00; A45C 13/103; A45F 5/00; A45F 2005/006; A01M 31/004; B65D 81/22
See application file for complete search history.

(56) References Cited

U.S. PATENT DOCUMENTS

| | | | | | |
|---|---|---|---|---|---|
| 2,444,294 | A | * | 6/1948 | Jones | A61C 19/10 206/83 |
| 4,883,171 | A | * | 11/1989 | Carlton | A01M 31/004 206/315.11 |
| 5,263,838 | A | * | 11/1993 | Meuser | A01M 31/004 206/315.11 |
| 5,774,925 | A | * | 7/1998 | Pryor | A46B 9/005 15/244.1 |
| 6,068,113 | A | * | 5/2000 | Schmaling | A24F 23/00 206/213.1 |
| 6,612,434 | B1 | * | 9/2003 | Redzisz | A01K 97/06 190/109 |
| 7,201,271 | B1 | * | 4/2007 | Saad | A45C 11/00 132/315 |

(Continued)

*Primary Examiner* — Bryon P Gehman
(74) *Attorney, Agent, or Firm* — Meunier Carlin & Curfman LLC

(57) ABSTRACT

Disclosed is a container for housing a diaphragm game call, comprising a case having a first member, a second member, and a line of connection therebetween, a fastening means for connecting the first and second members, and at least one moisture-retaining member disposed between the first and second members. The moisture-retaining member is preferably a sponge that can be soaked with an alcohol-free mouthwash, which helps to prevent the latex reed in the diaphragm game call from drying out and requiring replacement. The mouthwash also acts as a sanitizer to prevent the accumulation of germs and bacteria. A D-ring on the exterior of the case provides an attachment location for a lanyard, which allows a user to carry the device around his or her neck, or to remove the lanyard and carry the device in a pocket.

20 Claims, 4 Drawing Sheets

(56) References Cited

U.S. PATENT DOCUMENTS

| | | | | |
|---|---|---|---|---|
| 7,308,994 B1* | 12/2007 | Vanicek | ............... | A01M 31/004 |
| | | | | 206/315.11 |
| 7,726,472 B1* | 6/2010 | Duvuvuei | ............ | A01M 31/004 |
| | | | | 206/207 |
| 7,946,424 B2* | 5/2011 | Gupta | ................ | B65D 81/1075 |
| | | | | 206/472 |
| 8,573,232 B2* | 11/2013 | Glenn, Jr. | ........... | A45D 19/0008 |
| | | | | 132/108 |
| 8,875,873 B2* | 11/2014 | Cinader, Jr. | ............. | A61C 7/14 |
| | | | | 206/368 |
| 9,650,181 B2* | 5/2017 | Giraud | ................. | B65D 43/162 |
| 2006/0076250 A1* | 4/2006 | Kwasney | ............... | A45D 44/20 |
| | | | | 206/83 |
| 2006/0174453 A1* | 8/2006 | Herman | .............. | A01M 31/004 |
| | | | | 24/3.12 |
| 2006/0266776 A1* | 11/2006 | Plakke | ...................... | A45F 5/02 |
| | | | | 224/222 |

* cited by examiner

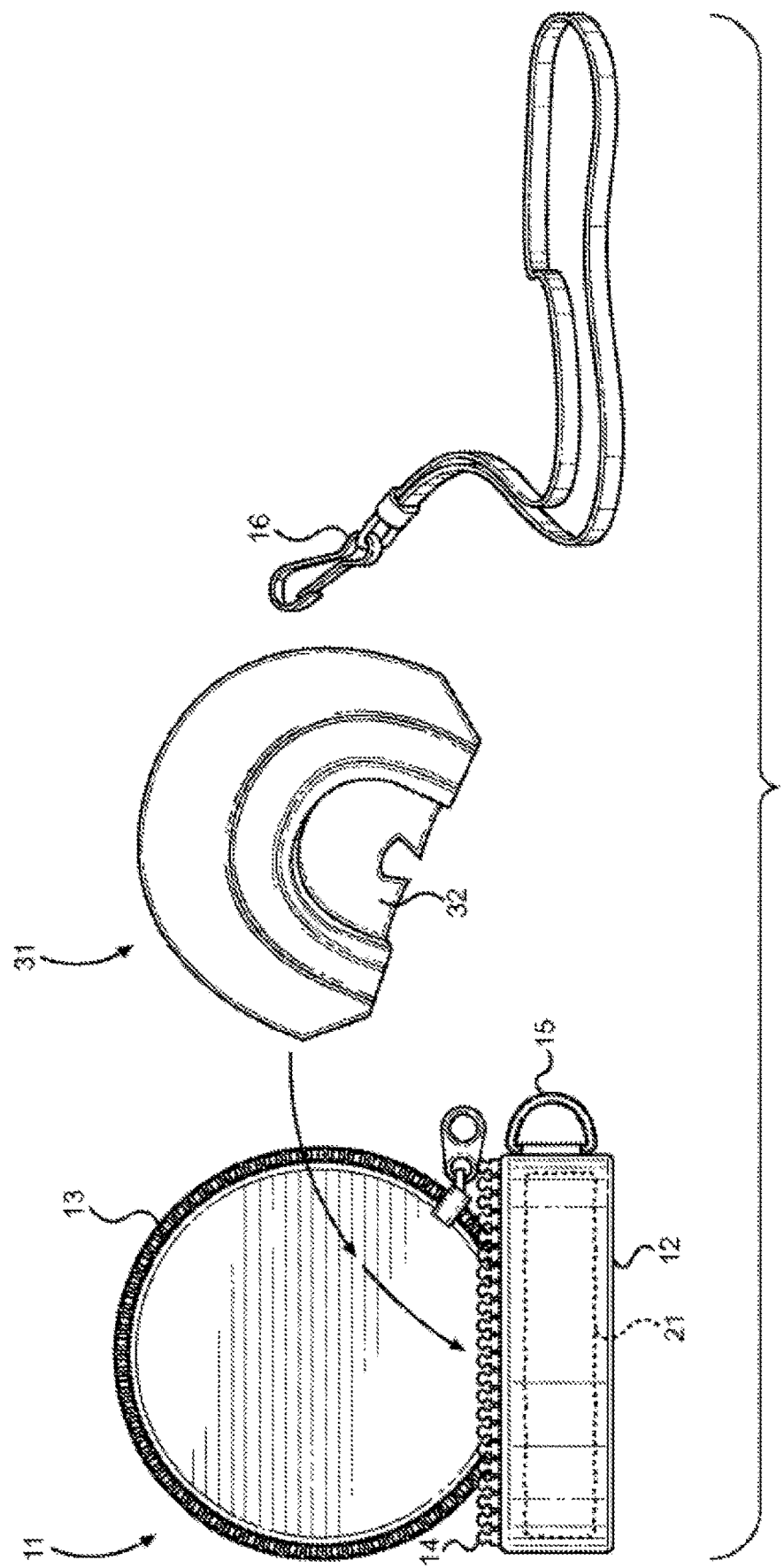

DIAPHRAGM GAME CALL CASE

FIELD OF THE INVENTION

This application is a continuation of application Ser. No. 13/792,570, filed Mar. 11, 2013, the entire contents of which are incorporated herein by reference. The present invention relates to a diaphragm game call. More particularly, it pertains to a case for storing and retaining the moisture in a diaphragm game call.

BACKGROUND OF THE INVENTION

One of the most difficult aspects of hunting is attracting an animal into a hunter's range. This is often accomplished by appealing to the animal's senses. A hunter can appeal to an animal's sense of sight by setting up a decoy that resembles a particular species. The hunter can also attempt to lure an animal into range by appealing to the animal's sense of smell by scenting his or her clothing with a composition the prey will find attractive. Finally, a hunter appeals to the animal's sense of hearing with hunting calls. As can be appreciated, hunting calls are noises hunters make to attract specific animals. Hunting calls can be made with a hunter's hands and mouth, and have been in use for thousands of years.

The successfulness of luring game animals by sight, smell and sound depends on the species of game animal being hunted. Some animals are more easily attracted by one particular sense than others. It is well known that wild turkeys, for example, are attracted by sound. There are a variety of vocalizations for attracting wild turkeys, including gobbles, clucks, putts, purrs, yelps, cutts, cackles and kee-kees.
There are a variety of turkey calls commercially available for reproducing these different vocalizations, however, one of the most popular are diaphragm game calls.

A diaphragm game call is an apparatus that is inserted into the mouth, and can be used in a hands free manner. This is particularly beneficial when attempting to lure a turkey into range for a kill shot. As can be appreciated, any movement made by the hunter may be heard by the turkey, and can scare it out of range. Diaphragm game calls include one or more reeds that vibrate as air passes thereover. The reeds are generally constructed of latex, making them susceptible to damage. If not properly cared for, the latex can be easily damaged if it comes into contact with a sharp object, and can dry out and become brittle.

The present invention overcomes the problems inherent in diaphragm game calls with a container for storing and retaining the moisture in a diaphragm game call. The device comprises a container made of plastic, aluminum, steel, or another suitable material. The case includes a fastener on the exterior for attachment of a lanyard. The device can be carried via the lanyard, which can be removed for carrying in a pocket. The device further includes a sponge that covers the interior thereof, and takes up approximately half the depth of the container. The sponge can be soaked with an alcohol free mouthwash, which helps to prevent the latex reed in the diaphragm game call from drying out and requiring replacement. The mouthwash also acts as a sanitizer to prevent the accumulation of germs and bacteria.

DESCRIPTION OF THE PRIOR ART

Devices have been disclosed in the prior art that relate to diaphragm game call cases. These include devices that have been patented and published in patent application publications. These devices generally relate to cases for housing and protecting a diaphragm game call. The following is a list of devices deemed most relevant to the present disclosure, which are herein described for the purposes of highlighting and differentiating the unique aspects of the present invention, and further highlighting the drawbacks existing in the prior art.

Specifically, Duvuvuei, U.S. Pat. No. 7,726,472 discloses a system and method for storing, cleaning, drying, and hunting with diaphragm game call. The device comprises a sturdy, sealable, watertight container that is adapted to house and secure one or more diaphragm callers in a fixed position. The device is also adapted to separate and hold apart the multiple diaphragms of each game caller. Other embodiments include a means to facilitate rinsing the game caller by a suitable rinsing agent. While the Duvuvuei device disclose an apparatus for storing a diaphragm caller, it does not utilize a sponge on the interior that can be soaked with an alcohol free mouthwash to prevent the latex from drying out.

In addition, to Duvuvuei, Carlton, U.S. Pat. No. 4,883,171, discloses an animal call holder that includes a container having a bottom portion with a pocket clip, loops, and a neck lanyard. The container also has an openable lid hinged to the bottom portion. The top may be vapor permeable, but water resistant in order to dry out wet animal call devices in the holder. The top inside includes strips upon which indicia identifying the call devices can be marked. The '171 patent includes a pocket clip, and storage pouches for multiple diaphragm callers stacked one on top of the other, thereby helping a user to sort and organize a number of callers. The present invention provides a container having a sponge that covers the interior thereof to protect the latex reed in a caller.

Plakke, U.S. Published Patent Application No. 2006/0266776 discloses an armband having an attached array of one-hand accessible, quiet opening and closing diaphragm call reed storage pockets. The pockets comprise an accordion, envelope-shape with internal separators forming an array of storage pockets to hold diaphragm call reeds for hunting. A silent magnet and metal non-contacting closure and protruding tab enable silent one-handed opening and closing of the pocket. Similar to the Carlton device, the Plakke application discloses a diaphragm call holder that is designed for holding multiple callers. The device does not provide a means of preventing the reed from drying out, or a means of sanitizing the caller to prevent the spread of bacteria and other pathogens.

Additionally, Meuser, U.S. Pat. No. 5,263,838 discloses a container for turkey callers having a body of flexible material with a first end portion adapted to overlap a second end portion to provide a container for storage and transportation of a turkey caller. The first and second end portions are adapted to be reversed and folded and held in place with a strap to expose the turkey caller for instant use when the container and turkey caller are in place on the front of a hunter. While the Meuser device provides a case for a diaphragm caller, the structure and function are considerably different. The Meuser device is designed to attach to the waist of a user, and provides a means of quickly accessing the caller. The present invention provides a case having a sponge on the interior thereof for moistening and sanitizing the caller between uses.

Finally, Herman, U.S. Published Patent Application No. 2006/017 4453 discloses a clip for securing a diaphragm hunting call that can be releasably secured to a hat or other garment for holding a diaphragm hunting call. The device comprises a main body, a supporting wall, a clip mechanism, and an item retaining mechanism. Similar to the '838 device, Herman discloses a holder that is designed to provide ease of access to the caller. The present invention, however, discloses a case designed for storing the caller for an extended period of time and preventing it from drying out between uses.

The devices disclosed in the prior art provide cases for holding a diaphragm game call. These devices are generally intended for storing the caller for short periods of time between use, and provide quick access thereto when hunting. The devices known and disclosed in the prior art, however, do not utilize a means of preventing the caller from drying out, and for sanitizing. The present invention provides a case having a sponge on the interior thereof. The sponge can be soaked with an alcohol free mouthwash, thereby moistening the latex in the reed while at the same time disinfecting the caller.

In light of the prior art and the disclosed elements of the present invention, it is submitted that the present invention substantially diverges in design elements from the prior art. Consequently, it is clear that the present invention is not described by the art and that a need exists for a diaphragm game call case having a means of preventing the caller from drying out, and for sanitizing. In this regard, the instant invention substantially fulfills these needs.

SUMMARY OF THE INVENTION

In view of the foregoing disadvantages inherent in the known types of diaphragm call cases now present in the prior art, the present invention provides a new diaphragm call case wherein the same can be utilized for providing convenience for the user when storing and cleaning a diaphragm game call.

It is therefore an object of the present invention to provide a new and improved diaphragm call case device that has all of the advantages of the prior art and none of the disadvantages.

It is another object of the present invention to provide a new and improved diaphragm call case that can house a conventional diaphragm gamecall.

Another object of the present invention is to provide a new and improved diaphragm call case that includes a means of preventing the caller from drying out.

Yet another object of the present invention is to provide a new and improved diaphragm call case that provides a means of sanitizing the caller between uses.

Another object of the present invention is to provide a new and improved diaphragm call case that includes a sponge that covers the interior thereof. The sponge can be soaked with an alcohol free mouthwash, which helps to prevent the latex reed in the diaphragm game call from drying out and requiring replacement.

Still another object of the present invention is to provide a new and improved diaphragm call case that can be carried via a removable lanyard.

A final object of the present invention is to provide a new and improved diaphragm call case that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 is a view of the present invention with a conventional diaphragm game call being inserted into the open case.

DETAILED DESCRIPTION OF THE INVENTION

Figure 1:
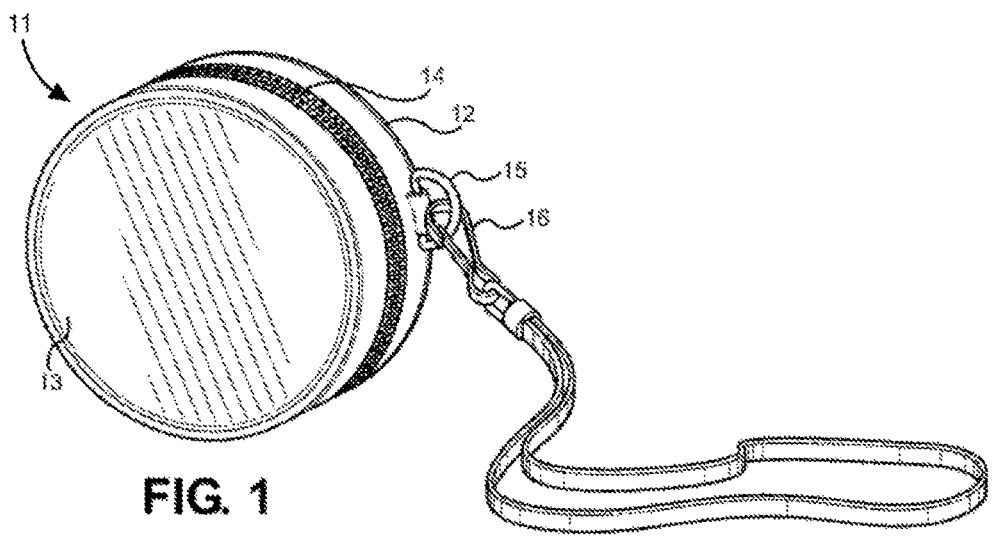
FIG. 1 is a perspective view of the present invention, with the case in a closed position and the lanyard attached to the D-ring.

Reference is made herein to the attached drawings. Like reference numerals are used throughout the drawings to depict like or similar elements of the diaphragm call case. For the purposes of presenting a brief and clear description of the present invention, the preferred embodiment will be discussed as used for housing a conventional diaphragm game call. The figures are intended for representative purposes only and should not be considered to be limiting in any respect.

Referring now to FIG. 1, there is shown a perspective view of the present invention, wherein the device is comprised of a case 11 having a first member 12, a second member 13, and a line of connection therebetween, and a fastening means 14 for connecting said first and second members. The first and second members create an interior space for housing a conventional diaphragm game call. Contained within the case 11 is a moisture-retaining member, such as a sponge, which is disposed between the first and second members. The sponge can be soaked in alcohol free mouthwash, which helps to retain the moisture in the diaphragm call, and additionally sanitizes the call to prevent a buildup of bacteria thereon. The exterior of the case 11 can include a carrying means 15, such as a D-ring for attachment of a lanyard 16 thereto. The diaphragm call can be placed inside the case 11 for storage between uses, which keeps the call moist and clean.

In the preferred embodiment, the case 11 is round with a flat top and bottom, resembling a cylinder. The case 11 is large enough to contain at least one diaphragm game call therein. The line of connection therebetween creates an attachment for the first and second members, and acts as a hinge for the case 11. The fastening means provides a means of accessing the interior of the case 11. In the preferred embodiment, the fastening means comprises a zipper that encircles the perimeter of the case 11. Alternately, the shape of the case 11 may vary for use or design purposes, and may be square, rectangular, oval, or any other desired shape. Additionally, the case 11 does not require a line of connection therebetween, but may alternately utilize a separate lid, a friction fit lid, a latch, or another suitable means of attaching the first and second members.

The D-ring is affixed to the exterior of the case 11, and provides a means of securing the case 11 during transport. A lanyard can be attached to the case 11, which can be used to carry the case 11 around the neck, wrist, or be attached to another object. The small size of the case 11 increases the chance that the case 11 may be lost or misplaced. With the lanyard attached, the case 11 remains visible and securely attached to a desired person or object at all times. The lanyard includes a clasp that allows for detachment thereof. A user may detach the lanyard and store the case 11 in a pocket.

Figure 2A:
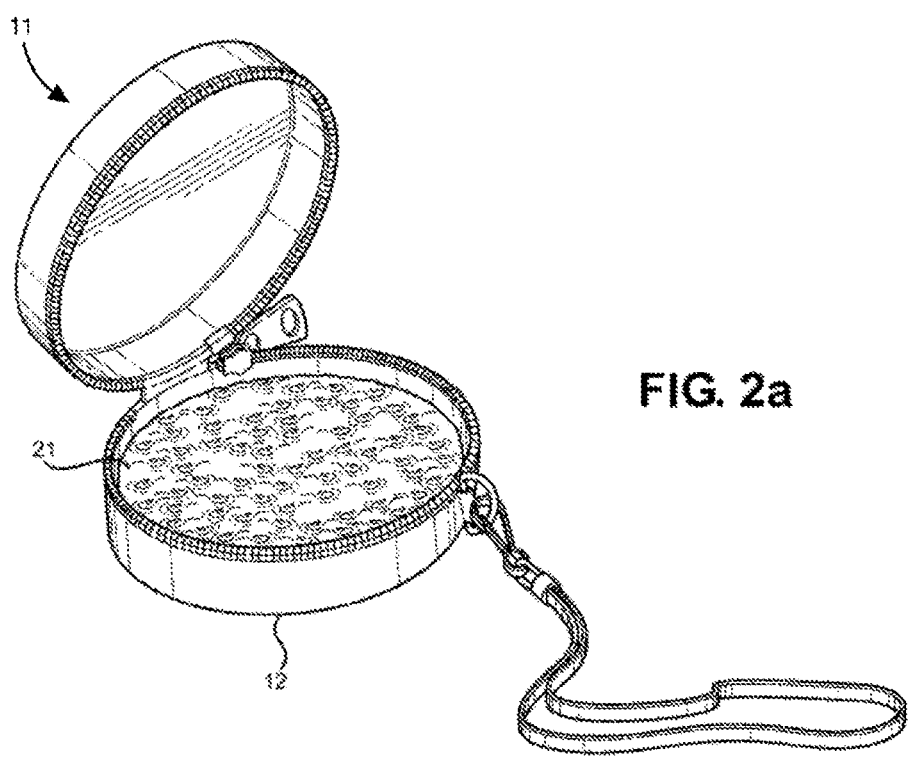
FIG. 2a is a perspective view of the present invention with the case in an open position.

Referring now to FIG. 2a, there is shown a perspective view of the present invention, with the case 11 in an open position. The interior of the case 11 includes a means of preventing the caller from drying out. In the preferred embodiment, the interior of the case 11 includes a porous material that can absorb a fluid, such as a conventional sponge 21. The sponge 21 can be constructed of cellulose wood fibers, foamed plastic polymers, or can alternately be a natural sponge 21. The sponge 21 covers the interior of the case 11, and takes up a substantial portion of the depth of the first member 12.

The sponge can be soaked with a liquid to help retain moisture in the diaphragm game call when placed therein. In the preferred embodiment, alcohol-free mouthwash is added to the sponge to help retain moisture. The alcohol-free mouthwash serves a threefold purpose. The liquid in the mouthwash prevents the latex in the diaphragm from drying out, which would otherwise impair the ability of the reed to generate sound when placed in the user's mouth. The mouthwash additionally acts as a chemotherapeutic agent to kill bacteria or other pathogens that are transferred onto the reed from the user or the environment. Finally, the use of alcohol-free mouthwash ensures that alcohol does not break down the latex in the reed, which would prevent it from properly vibrating during use.

Figure 2B:
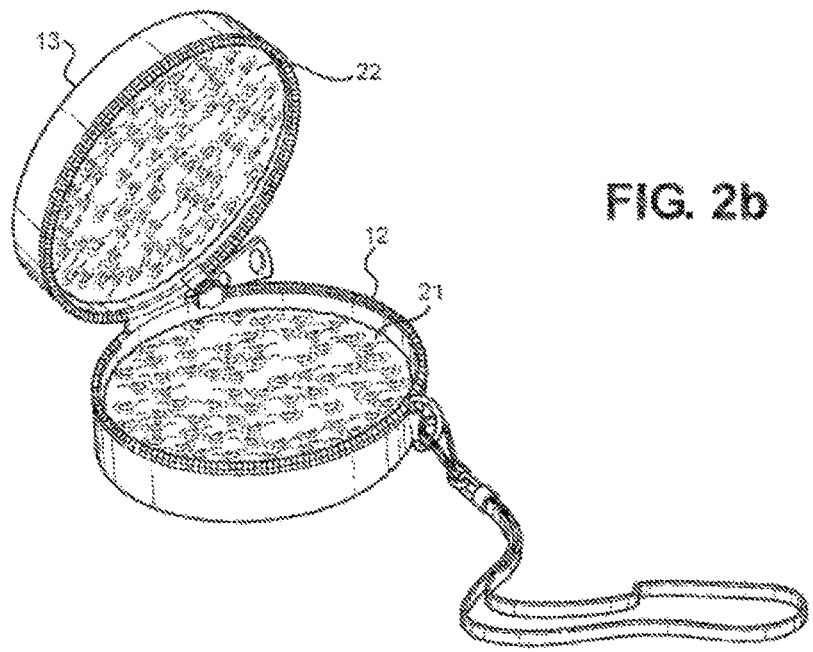
FIG. 2b is a perspective view of an alternate embodiment of the present invention, wherein the case includes a first sponge in the first member and a second sponge in the second member.

In a first embodiment, the device can include one sponge attached to the second member. As shown in FIG. 2b, an embodiment of the present invention can utilize a first sponge 21 in the first member 12, and a second sponge 22 in the second member 13. This provides additional coverage of the diaphragm game call, and ensures that both sides of the call are kept moist and free of bacteria and pathogens. In both embodiments, the sponge can be permanently attached to the member with an adhesive or similar means of creating a permanent connection therebetween.

Figure 3A:
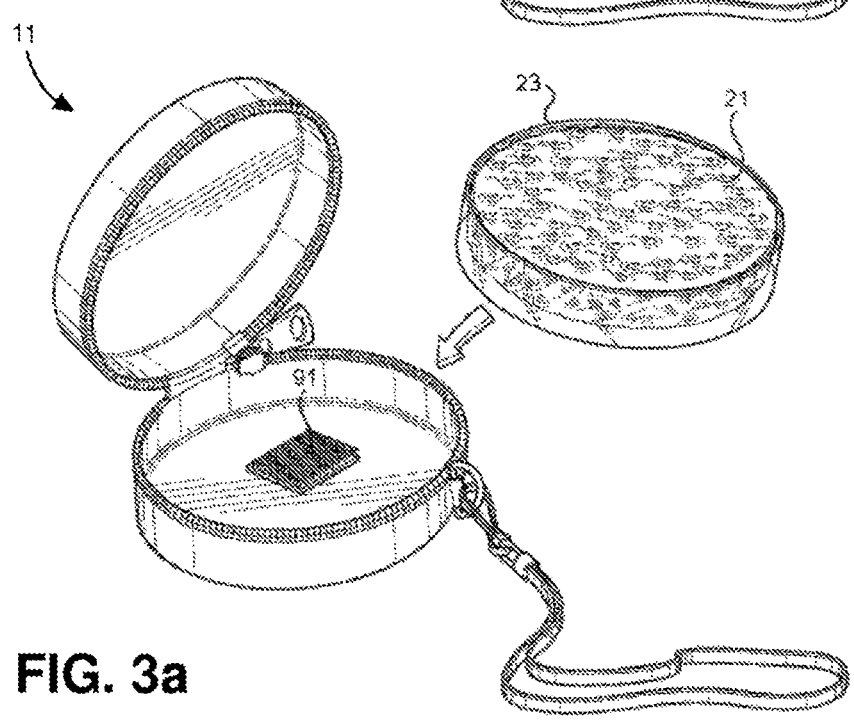
FIG. 3a is a perspective view of an alternate embodiment of the present invention, wherein the sponge is removably attached to the case via a mount
Figure 3B:
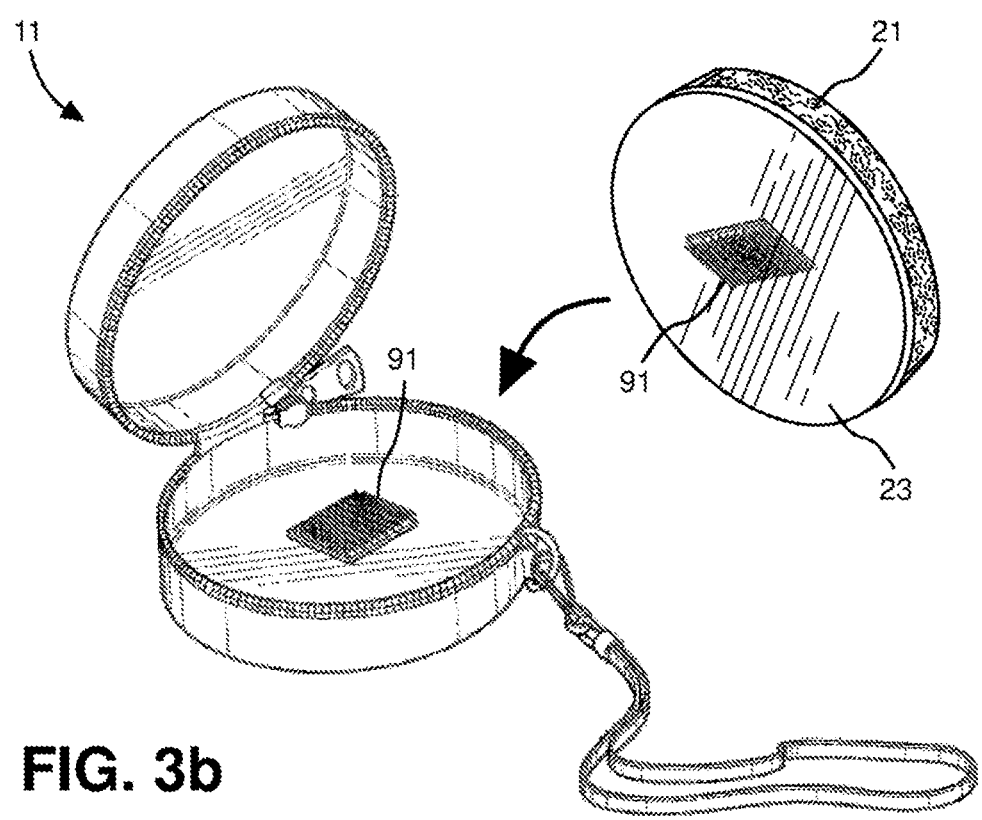
FIG. 3b is a perspective view of the alternate embodiment illustrating the underside of the mount.

As shown in FIG. 3a and FIG. 3b, the sponge 21 can be removably attached to the case 11. The sponge 21 can be attached to a mount 23 that can be secured within the case 11 and removed as desired. The mount 23 is preferably constructed of a water impervious material, such as polycarbonate, polyvinyl chloride, polyethylene, or another suitable material. This prevents the fluid contained within the sponge 21 from leaking. The mount 23 can be secured into position with a locking means 91, such as a twist lock, hook and loop fastener, snap, button, magnet, or other similar fastener. This enables the user to remove the mount 23 and sponge 21 for replacement. In the illustrated embodiment shown in FIG. 3a and FIG. 3b, the locking means 91 are both portions of a hook and loop fastener attached respectively to the surface of the first member 12 and the underside surface of the mount 23.

Referring now to FIG. 4, there is shown a view of the present invention, with a conventional diaphragm game call 31 being inserted into the open case 11. The case 11 is designed for both long term and short term storage of the diaphragm game call 31. In operation, a user can open the fastening means 14 to provide access to the interior of the case 11. The sponge 21 can be soaked with a fluid, such as alcohol-free mouthwash, and the game call 31 can be inserted therein. The fastening means can be closed, which creates a seal to secure the game call 31 into position. The amount of space within the case 11 is preferably less than the depth of the game call 31, which causes compression of the sponge when the call is placed therein. This ensures that the game call 31 makes contact with the sponge 21 and alcohol-free mouthwash, thereby helping to moisten the reed 32 and prevent it from drying out, while at the same time disinfecting the call after being placed in a user's mouth or other location that is susceptible to bacteria and other pathogens.

The fastening means creates a secure connection between the first and second members 12, 13, thereby preventing the mouthwash contained therein from evaporating, which could otherwise allow the reed to dry out and become damaged. The walls of the first and second member are preferably constructed of a water impervious material that prevents the mouthwash from leaking out. The first and second member are preferably constructed from plastic, steel, aluminum, or another suitable material that retains moisture within the sponge.

Once the diaphragm game call 31 is secured within the case 11, the device can be transported to a desired location for use. A user can attach the lanyard 16 to the D-ring 15 and carry the device around the neck, arm, or other suitable location, or can alternately detach the lanyard for storage in a pocket, backpack, or other location. When use of the diaphragm game call is desired, the user can open the fastening means, remove the game call 31 from the case 11, and insert it directly into his or her mouth. Because the game call 31 was stored in an alcohol-free mouthwash, the call will be free of bacteria and other pathogens, and does not require rinsing or cleaning. The case 11 can then be carried once again while the game call 31 is in use, until it is replaced back within the case 11. At the end of a cycle of use, the user can check the moisture level of mouthwash within the sponge 21 and add more mouthwash if required.

Overall, the present invention provides a secure and sanitary means of storing and transporting a diaphragm game call. The device protects the call from being damaged by sharp objects, prevents it from being easily lost, retains moisture within the latex reed, and disinfects the device after use. The case can be easily transported to and from a hunting location with the lanyard, or can be placed in a pocket. As an added benefit, some of the mouthwash solution will be transferred into the mouth of the user during use, which can kill the bacterial plaque that causes cavities, gingivitis, and bad breath.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container for housing a diaphragm game call, the container comprising:
   a case comprising a first member defining a first interior, and a second member defining a second interior, wherein the first member and the second member are constructed of a water impervious material to prevent fluid from leaking through the container, and the first interior and the second interior together define an interior space sized to enclose the diaphragm game call;
   the first member comprising a friction fit lid for closing the first member to the second member to enclose the interior space of the container;
   a mount removably disposed within the second member; and
   a compressible moisture-retaining material attached to the mount and removably disposed within the second member forming a compression space within the interior space and between the first member and the compressible moisture-retaining material, the compression space for storage of the diaphragm game call in contact with and compressed between the first member and the compressible moisture-retaining material.

2. The container of claim 1, wherein the compressible moisture-retaining material comprises a sponge.

3. The container of claim 1, wherein the container further comprises a D-ring for attachment of a lanyard thereto.

4. The container of claim 1, wherein the compressible moisture-retaining material is soaked in a liquid to retain moisture in the diaphragm game call when placed therein.

5. The container of claim 4, wherein the liquid comprises alcohol-free mouthwash.

6. The container of claim 1, wherein the water impervious material comprises plastic, steel, or aluminum.

7. The container of claim 1, wherein the mount is removably attached to the second member and constructed of a water impervious material.

8. The container of claim 7, wherein the compressible moisture-retaining material is removably attached to the mount.

9. The container of claim 1, further comprising the diaphragm game call disposed within the compression space.

10. A method of storing a diaphragm game call comprising:
    providing a container comprising:
      a case comprising a first member defining a first interior, and a second member defining a second interior, wherein the first member and the second member are constructed of a water impervious material to prevent fluid from leaking through the container, and the first interior and the second interior together define an interior space sized to enclose the diaphragm game call;
      the first member comprising a friction fit lid for closing the first member to the second member to enclose the interior space of the container; and
      a compressible moisture-retaining material disposed within the second member forming a compression space within the interior space and between the first member and the compressible moisture-retaining material, the compression space for storage of the diaphragm game call in contact with and compressed between the first member and the compressible moisture-retaining material;
    combining a liquid with the compressible moisture-retaining material;
    positioning a diaphragm game call onto the compressible moisture-retaining material; and
    closing the case to house the diaphragm game call.

11. The method of claim 10, wherein the liquid sanitizes the diaphragm game call.

12. The method of claim 10, wherein the liquid moistens the diaphragm game call.

13. The method of claim 10, wherein the liquid comprises alcohol-free mouthwash.

14. The method of claim 10, further comprising opening the case to access the diaphragm game call.

15. The method of claim 10, further comprising replacing the compressible moisture-retaining material.

16. A container for housing a diaphragm game call, the container comprising:
    a case comprising a first member defining a first interior, and a second member defining a second interior, wherein the first member and the second member are constructed of a water impervious material to prevent fluid from leaking through the container, and the first interior and the second interior together define an interior space sized to enclose the diaphragm game call;
    a compressible moisture-retaining material disposed within the second member forming a compression space within the interior space and between the first member and the compressible moisture-retaining material; and
    a diaphragm game call disposed within the compression space in contact with and compressed between the first member and the compressible moisture-retaining material.

17. The container of claim 16, further comprising a liquid disposed within the container.

18. The container of claim 17, wherein the liquid comprises alcohol-free mouthwash.

19. The container of claim 16, wherein the diaphragm game call comprises one or more reeds constructed of latex.

20. The container of claim 16, further comprising a mount disposed within the second member and constructed of a water impervious material, wherein the compressible moisture-retaining material is removably attached to the mount.

* * * * *